United States Patent [19]

Anger

[11] 4,321,892
[45] Mar. 30, 1982

[54] MULTIPLE-CYCLE, PISTON-TYPE INTERNAL COMBUSTION ENGINE

[76] Inventor: Robert M. Anger, 3323 Konkle St., Kalamazoo, Mich. 49001

[21] Appl. No.: 851,399

[22] Filed: Nov. 14, 1977

Related U.S. Application Data

[62] Division of Ser. No. 668,476, Mar. 19, 1976, Pat. No. 4,075,980.

[51] Int. Cl.$^3$ ............................................. F02B 75/20
[52] U.S. Cl. ................................. 123/59 EC; 60/622
[58] Field of Search ................... 123/1, 2, 37, 59 EC, 123/64, 25 D, 65 A, 59 BM; 60/620, 622, 619

[56] References Cited

U.S. PATENT DOCUMENTS

| | | | |
|---|---|---|---|
| 727,455 | 5/1903 | Rumpf | 123/1 |
| 1,498,757 | 6/1924 | Robertson | 123/1 |
| 2,280,487 | 4/1942 | Heylandt | 123/25 D |
| 2,406,404 | 8/1946 | Ryde | 123/65 A |
| 3,789,807 | 2/1974 | Pinkerton | 123/59 EC |
| 3,924,576 | 12/1975 | Siewert | 123/59 EC |

OTHER PUBLICATIONS

McGraw-Hill, *Encyclopedia of Science and Technology,* vol. 7, pp. 226 and 233.

*Primary Examiner*—Craig R. Feinberg
*Attorney, Agent, or Firm*—Gordon W. Hueschen

[57] ABSTRACT

The invention relates to a multiple-cycle internal combustion engine having as a unit of two 4-cycle cylinders operating 180° apart and one 2-cycle cylinder firing 90° after the 4-cycle cylinders fire. The 4-cycle exhaust is admitted to the intake port of the 2-cycle cylinder and the 2-cycle cylinder ports are opened and closed in correlation with the exhaust cycle of the 4-cycle cylinders so that 4-cycle exhaust is admitted to the 2-cycle cylinder and passes out through the outlet port thereof sweeping 2-cycle exhaust out along with it. Thus, advantages are taken of the uncombusted products in the 4-cycle exhaust to drive the 2-cycle cylinders. At the same time, advantage is taken of the higher efficiency of 4-cycle cylinders at low speeds and the higher efficiency of 2-cycle cylinders at high speeds to obtain an over all improvement in the efficiency of the engine.

3 Claims, 7 Drawing Figures

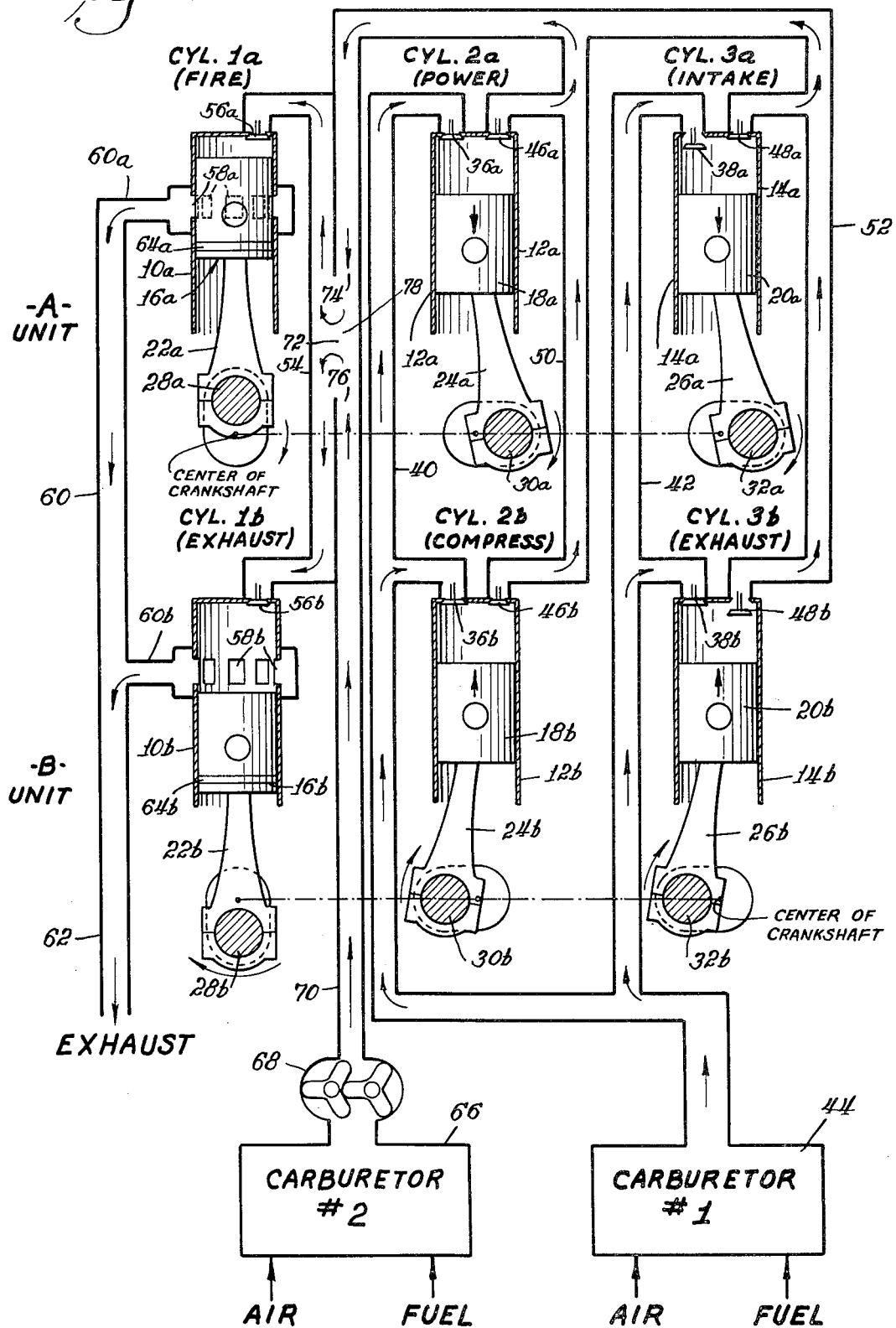

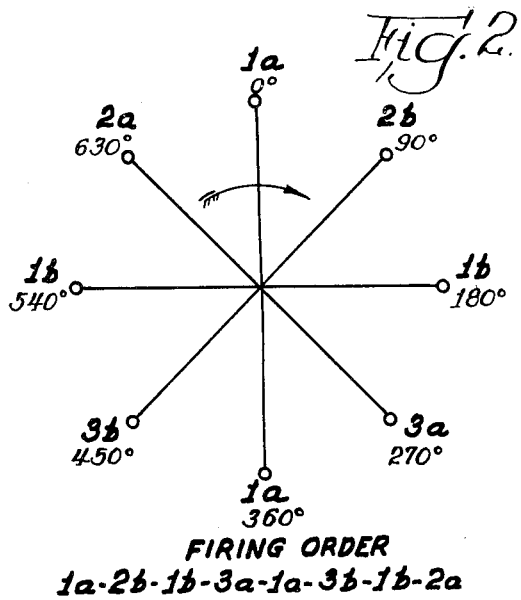
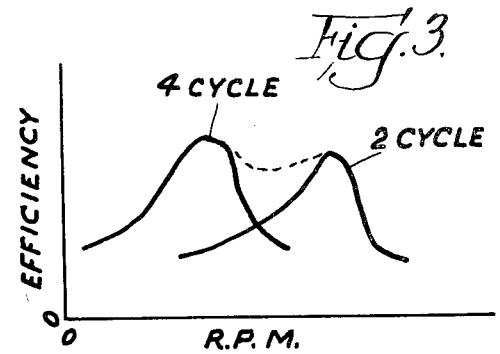
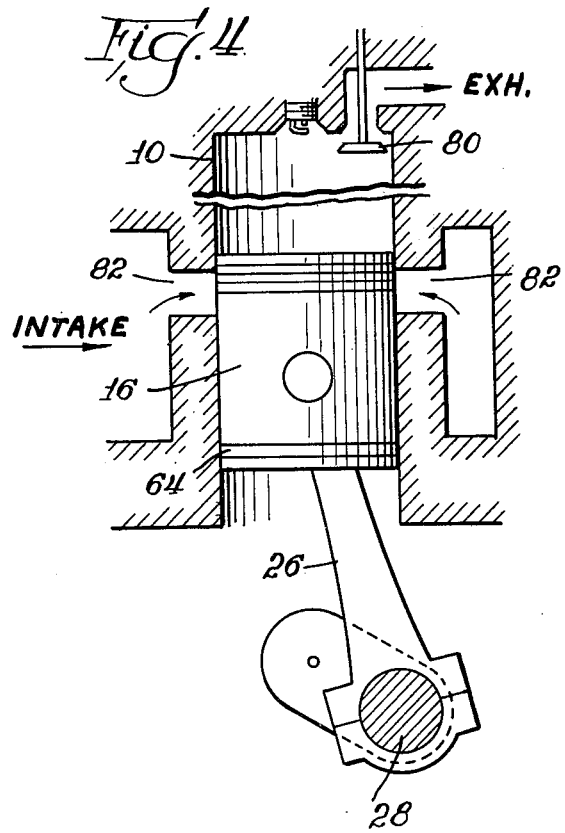
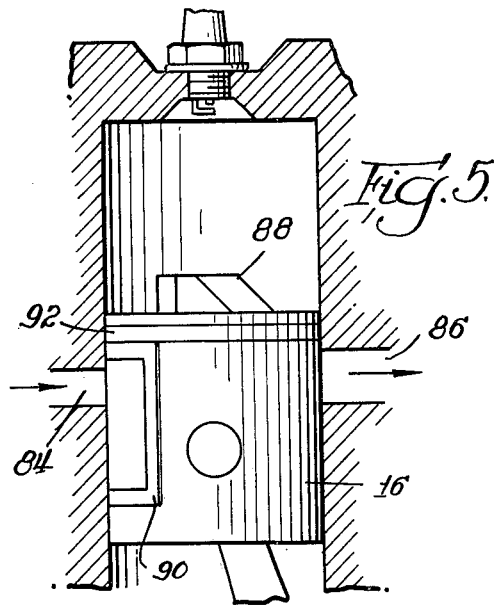
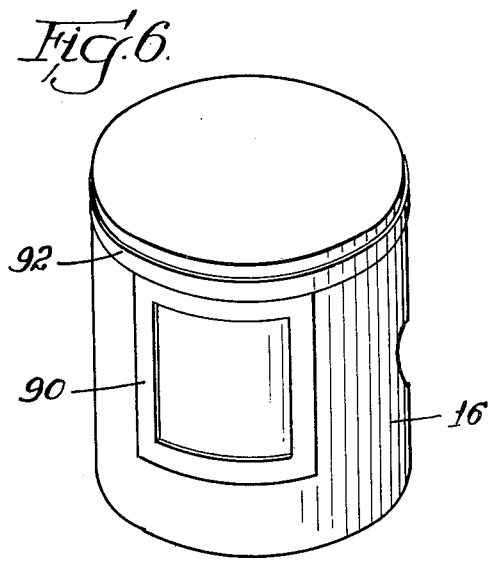

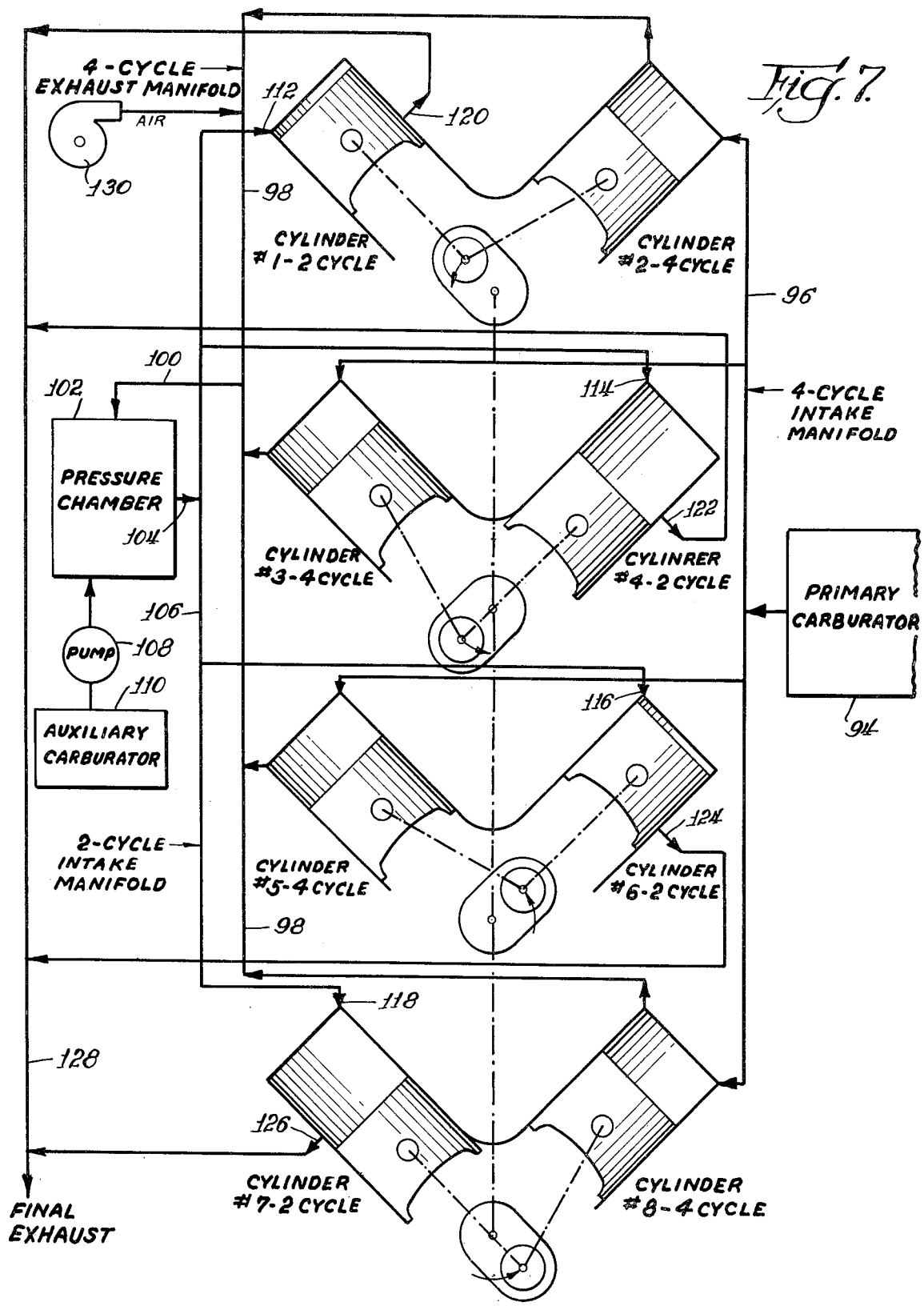

MULTIPLE-CYCLE, PISTON-TYPE INTERNAL COMBUSTION ENGINE

This is a division of application of Ser. No. 668,476, filed Mar. 19, 1976, now U.S. Pat. No. 4,075,980.

FIELD OF THE INVENTION

Prior Art

The invention relates to a piston-type, internal combustion engine. Such engines are generally operated either as 2-cycle or 2-stroke engines or as 4-cycle or 4-stroke engines. The 2-cycle cylinder engines fire every revolution of the crankshaft and the 4-cycle engines fire every other revolution of the crankshaft.

It has been proposed heretofore to recycle exhaust gases in a 4-cycle engine to cut down emissions and by reducing the temperature of combustion and by further combusting the exhaust gases. Only a portion of the 4-cycle exhaust can be handled in this manner so that the bulk of the exhaust gas must be further processed if lower emissions are to be obtained. Furthermore, little if any, increased efficiency is obtained in this manner.

OBJECTS OF THE INVENTION

It is an object of the invention to provide an improved piston-type internal combustion engine. It is a further object to provide a piston-type internal combustion engine having lower emissions. It is still a further object of the invention to provide a piston-type internal combustion engine having improved efficiency. These and other objects of the invention will appear as the description proceeds.

BRIEF SUMMARY OF THE INVENTION

This invention relates to a multiple-cycle, piston-type internal combustion engine having a basic unit comprising two 4-cycle cylinders operating 180° apart and a unit 2-cycle cylinder means firing 90° after the 4-cycle cylinders, manifold means for channeling 4-cycle exhaust from the 4-cycle cylinders to the intake port means of the unit 2-cycle cylinder, and means for opening and closing intake and exhaust port means in the unit 2-cycle cylinder means in correlation with the discharge of the 4-cycle exhaust from the 4-cycle cylinders.

The basic unit of the multiple-cycle, piston-type internal combustion engine of the invention comprises two 4-cycle cylinders operating 180° out of phase, that is, one cylinder firing 180° after the other, a unit 2-cycle cylinder means firing 90° out of phase with the 4-cycle cylinders, that is, firing 90° after the 4-cycle cylinders fire. It is to be understood that the unit 2-cycle cylinder means in the basic unit can comprise one cylinder or two or more cylinders operating in parallel, that is, receiving 4-cycle exhaust from a common manifold and firing simultaneously. The purpose of such parallel operation is to increase the displacement volume of the unit 2-cycle cylinder means thereby to increase the capacity of the unit 2-cycle cylinder means to handle 4-cycle exhaust. When two or more 2-cycle cylinders are operating in parallel, the resulting unit is the functional equivalent of a single large cylinder having twice the displacement volume. Thus, in effect the basic unit in accordance with the invention consists of two 4-cycle cylinders or the functional equivalent thereof and one 2-cycle cylinder or the functional equivalent thereof.

Two-cycle cylinders commonly have sidewall ports which are opened and closed by the passage of the piston. These ports are located in the sidewalls of the cylinders just above the piston head at bottom dead center and as the piston rises from bottom dead center they gradually close and as the piston approaches bottom dead center they gradually open. These sidewall ports may function either as intake ports or as exhaust ports, in which case a separate exhaust or intake port, respectively, is provided in the cylinder head. A top port of this kind is controlled by valve means operating substantially in unison with the sidewall ports. Also, one or more of the sidewall ports can function as an intake port means and the other or others as an exhaust port means, in which case the exhaust port means is located diametrically opposite from the intake port means and is somewhat higher so that the exhaust port opens before the intake port opens. Thus, the fuel gases may be added at the top of the cylinder and exhausted at the bottom thereof or fed in at the bottom thereof and exhausted at the other side thereof. This being understood, the description will proceed with reference to a unit 2-cycle means in which the fuel gas is fed in at the top and exhausted at the bottom, it being understood that the same considerations apply to either of the other two systems except as may be pointed out.

The exhaust port means of the unit 2-cycle cylinder means open about 80° before bottom dead center and close about 80° after bottom dead center. Opening and closing of the inlet port means is correlated with the opening and closing of the exhaust port means so that the incoming fuel gases force the 2-cycle exhaust out the exhaust port means. The intake port means opens after the exhaust port means to allow for expansion of the 2-cycle exhaust before the 4-cycle exhaust is admitted and, thus, to prevent back flow into the intake manifold. Ordinarily, it is sufficient if the intake port means opens about 10°–15° later. All degree designations herein, unless otherwise specified, are related to the crankshaft. Thus, the degree designations are twice what they would be if they were related to the cam shaft or distributor head. The exhaust port means of the unit 2-cycle cylinder means opens about 10° after the exhaust cycle of a 4-cycle cylinder begins, and close about 10° before it ends. This means that the intake port means opens about 20°–25° after the exhaust cycle of a 4-cycle cylinder begins. Since there is relatively little vertical movement of the piston during the first and last 20°–25°, the ports of the 2-cycle cylinder are open over the effective part of the exhaust cycle of each of the 4-cycle cylinders. As the 4-cycle cylinder begins to exhaust, the 4-cycle exhaust is admitted into the unit 2-cycle cylinder means and passes on through to the exhaust port means, thus forcing out the 2-cycle exhaust remaining therein and fills or substantially fills the 2-cycle cylinder with 4-cycle exhaust. This 4-cycle exhaust is then compressed and fired in the continuation of the cycle. When the exhaust ports of the 4-cycle cylinder open and the expansion of the gases force the exhaust out into the manifold means which channels the 2-cycle exhaust to the unit 2-cycle cylinder means, sufficient pressure is engendered in the manifold means for effective operation of the unit 2-cycle cylinder means. This pressure depends on back pressure of the system and may range from about 5 to about 40 pounds psi gauge, according to the particular engine. As the exhaust cycle of the 4-cycle cylinder continues, the rate at which exhaust gas is discharged gradually increases proportional to the harmonic motion of the piston and gradually decreases as the piston slows down as it approaches top dead center. Thus, after the initial buildup of pressure due to the expansion of the exhaust gases into the manifold means, the 4-cycle piston is the motive force back of the further expulsion of 4-cycle exhaust gas into the manifold means. Opening and closing of the intake and exhaust port means of the unit 2-cycle cylinder correlates with the rate of discharge of 4-cycle gas due to the movement of the 4-cycle piston. Thus, when the effect of the piston in the exhaust cycle begins significantly to be felt, that is, about 20°-25° past dead center of the 4-cycle cylinder, the intake port means of the unit 2-cycle cylinder means begins to open. As the sidewall ports being to open when the 2-cycle piston is still rapidly moving, it moves in simple harmonic motion reaching a maximum speed at 90°, the sidewall port means open rapidly. Thus, 10°-15° later, when the intake port means opens, the exhaust ports are already wide enough to handle any surge of 4-cycle exhaust from the 2-cycle intake manifold. Conversely, the rate at which the 4-cycle exhaust is discharged, after the first burst of discharge due to the expansion of the 4-cycle exhaust gases, is proportional to the simple harmonic motion of the 4-cycle piston. This is at a minimum at bottom dead center and not significantly great 20°-25° past bottom dead center when the intake port means of the unit 2-cycle cylinder means opens and reaches a maximum at 90° past bottom dead center when both the intake port means and the sidewall ports of the unit 2-cycle cylinder means are fully opened. Then as the 2-cycle piston passes bottom dead center, the rate at which the sidewall ports close gradually increases until the 80° point is reached, and at the same time the rate of discharge of the 4-cycle exhaust drops off, first sharply, and then gradually, so that by the time the sidewall ports of the unit 2-cycle cylinder means are closed, the rate of discharge of the 4-cycle exhaust is minimal. The intake port means may close at or somewhat before this point.

After the 2-cycle intake and exhaust port means close, the 4-cycle exhaust therein is compressed and the unit 2-cycle cylinder means is fired substantially at top dead center. The timing may be slightly before or slightly after top dead center in accordance with timing practices already well known in the art. Ninety degrees before this, the second 4-cycle cylinder will have reached top dead center in completion of its compression cycle and will then be fired. Again the timing may be slightly before or slightly after top dead center in accordance with timing practices already well known in the art. When that 4-cycle cylinder is at bottom dead center and ready to start the exhaust cycle, the unit 2-cycle cylinder means will be 90° past dead center. Ten degrees later the 2-cycle sidewall ports begin to open and 2-cycle exhaust is vented into the exhaust pipe. Ten to 15° later, the intake port means opens to admit 4-cycle exhaust from the second 4-cycle cylinder which is already 10° past bottom dead center on the exhaust cycle. The 4-cyle exhaust thus displaces the 2-cycle exhaust in the unit 2-cycle cylinder means. Continuation of the cycle then compresses the trapped 4-cycle exhaust and the cylinder is fired when the piston reaches top dead center and thus the cycle is repeated.

The opening of the 2-cycle exhaust port means should be delayed as long as possible in order to obtain advantage of the expansion of the gases in the firing stroke. On the other hand, it must not be delayed so long that excessive pressure builds up in the 4-cycle cylinder and the manifold means. Pressure of 4-cycle exhaust in the manifold means is not only desirable but necessary for the operation of the unit 2-cycle cylinder means as above noted. This ordinarily will result from the continued expansion of the 4-cycle exhaust after the 4-cycle exhaust ports are open and may be as much as 5-20 pounds psi gauge with periodic surges up to about 40 pounds psi gauge during that period when the 4-cycle exhaust port means is open and the 2-cycle intake means is closed. For practical purposes, it has been found that the proper balance is maintained if the 2-cycle exhaust port means begins to open at about 80° before bottom dead center and close at about 80° thereafter, that is, 80° past bottom dead center. It is to be understood, however, that variations above and below these figures can be consistent with the above stated objects of getting the most out of the expansion in the unit 2-cycle cylinder means without excessive buildup of 4-cycle exhaust pressure and the 2-cycle intake means about 10°-15° thereafter.

It will be seen therefore that the basic unit of the multiple-cycle, piston-type internal combustion engine of the invention comprises two 4-cycle cylinders operating 180° apart and one unit 2-cycle cylinder means firing 90° after each 4-cycle cylinder is fired, together with means for channeling 4-cycle exhaust to the intake port means of the unit 2-cycle cylinder means and means for coordinating the opening and closing of the intake and exhaust port means of the unit 2-cycle cylinder means with the discharge of 4-cycle exhaust from a 4-cycle cylinder, and means for firing the unit 2-cycle cylinder means 90° after the first 4-cycle cylinder is fired and firing it again 90° after the second 4-cycle cylinder is fired.

The basic unit of the invention may advantageously be incorporated into a conventional 8-cylinder engine, advantageously, a V-8 engine with 4 cylinders operating on four cycles and four on two cycles. In such a construction there will be two basic units, each consisting of two 4-cycle cylinders and two 2-cycle cylinders operating in parallel. Thus, there will be two unit 2-cycle cylinder means, that is, two sets of 2-cycle cylinders operating in parallel. The two units also will be operating 180° apart so that when one is on down stroke the other one is on up stroke. A standard 8-cylinder engine, particularly a V-8 engine can be converted to a multiple-cycle engine according to the invention by converting two cylinders, which simultaneously reach top dead center, into parallel operation as one unit 2-cycle cylinder means and two other cylinders, which at the same time simultaneously reach bottom dead center into parallel operation as a second unit 2-cycle cylinder means. Thus, the two unit 2-cycle cylinder means will be operating 180° apart. Of the remaining four cylinders, two which operate 180° apart and fire 90° ahead of the first unit 2-cycle cylinder means constitute, with the first unit 2-cycle cylinder means, one basic unit, and another two operating 180° apart from each other, 180° apart from the first two, and 90° ahead of the second unit 2-cycle cylinder means will constitute, together with the second unit 2-cycle cylinder means, the second basic unit.

If a V-8 engine is numbered in accordance with a Chevrolet system, with the odd numbers on one bank and the even numbers on the other, a conventional firing order is 1-8-4-3-6-5-7-2. In modifying this type of engine in accordance with the invention, cylinders 1 and 6 will be operated as one unit 2-cycle cylinder means and cylinders 4 and 7 will be operated together as a second unit 2-cycle cylinder means. The firing order in such a modified V-8 engine will be (1,6)-8-(4,7)-3-(1,6)-5-(4,7)-2. If desired, however, cylinders 5 and 8 could be operated together as one unit 2-cycle cylinder means and cylinders 2 and 3 as the other unit 2-cycle cylinder means. In such case, the firing order would be 1-(5,8)-4-(2,3)-6-(5,8)-7-(2,3).

If the firing order in the original V-8 engine were 1-6-2-5-8-3-7-4, the firing order in the engine modified according to the invention could be (1,8)-6-(2,7)-5-(1,8)-3-(2,7)-4, or 1-(3,6)-2-(4,5)-8-(3,6)-7-(4,5); or if the firing order of the original V-8 engine were 1-5-4-2-6-3-7-8, the firing order of the modified engine could be (1,6)-5-(4,7)-2-(1,6)-3-(4,7)-8 or 1-(3,5)-4-(2,8)-6-(3,5)-7-(2,8); or if the firing order in the original V-8 engine were 1-8-7-3-6-5-4-2, the firing order in the modified engine according to the invention would be (1,6)-8-(4,7)-3-(1,6)-5-(4,7)-2; or 1-(5,8)-7-(2,3)-6-(5,8)-4-(2,3). Thus, in any firing order, the first four cylinders represent one complete 4-cycles and the second firing order represents a second complete 4-cycles. Any one cylinder from one cycle can be linked to the corresponding cylinder of the other cycle, since such cylinders will always reach top dead center at the same time, though one at the beginning of the firing stroke and one at the beginning of the intake stroke, since they are 180° out of phase. When two such cylinders are converted to a unit 2-cycle cylinder means, the top dead center position in always the firing stroke. That is why the same firing orders are obtained in converting a V-8 engine whether the original firing order was 1-8-4-3-6-5-7-2 or 1-8-7-3-6-5-4-2. That also is the reason why the same two cylinders are linked together to form the two unit 2-cycle cylinder means in the above firing orders as in one where the original firing order was 1-5-4-2-6-3-7-8.

While the exhaust gases from the 4-cycle cylinders are combustible and as such capable of operating the unit 2-cycle cylinder means of the invention without modification, it may be desirable sometimes to introduce ambient air, or other source of oxygen, to improve the combustion. This is done by raising ambient air to a pressure equal to or above the pressure obtaining in the manifold means and introducing the pressurized air thereinto. Similarly, it is sometimes desirable to co-mingle with the 4-cycle exhaust gases additional fuel gases to improve the efficiency of the unit 2-cycle cylinder means. The inlet fuel also must be raised to a pressure equal to or above that obtaining in the manifold means and when thus pressurized, introduced into the manifold means. Suitably, the air and fuel gases are mixed in a suitable carburetor and the mixture raised by a suitable pump to the pressure necessary to admit them into the manifold means where they are comingled with the 4-cycle exhaust therein.

For effective operation, the displacement volume of the unit 2-cycle cylinder means must be sufficiently large compared with that of the 4-cycle cylinders to handle effectively the 4-cycle exhaust discharged therefrom. If the displacement volume of the unit 2-cycle cylinder means is too small, the 4-cycle exhaust discharged from the 4-cycle cylinders is not effectively utilized and simply passes through the unit 2-cycle cylinder means and out into the exhaust. If, on the other hand, the displacement volume of the unit 2-cycle cylinder means is too large, there will not be enough 4-cycle exhaust to sweep out the 2-cycle exhaust from the unit 2-cycle cylinder means and fill the unit 2-cycle cylinder means. In such case, reliance will have to be placed on auxiliary air and/or fuel to augment the volume of 4-cycle exhaust.

For optimum results, the displacement volume of the unit 2-cycle cylinder means should be approximately the displacement volume of one of the two 4-cycle cylinders associated therewith as the basic unit, times the expansion factor. Thus, if there is a two-fold expansion in the 4-cycle cylinders, the displacement volume of the unit 2-cycle cylinder means should be twice that of one 4-cycle cylinder and, if it is three times, then the displacement volume of the unit 2-cycle cylinder means should be three times that of one 4-cycle cylinder. As a practical matter, the displacement volume of the unit 2-cycle cylinder means should be somewhat less than optimum in order to obtain effective sweeping out of the 2-cycle cylinder exhaust. For practical purposes, it has been found that excellent results are obtained when the displacement volume of the unit 2-cycle cylinder means is twice that of one of the 4-cycle cylinders associated therewith in the basic unit, or, in other words, equal to the displacement volume of both 4-cycle cylinders associated therewith in the basic unit. Thus, in the conversion of a V-8 engine in accordance with the invention, the unit 2-cycle cylinder means comprise four cylinders equal in displacement volume to the four cylinders of the 4-cycle portion of the engine.

The multiple-cycle, piston-type internal combustion engine in accordance with the invention has the advantage of reducing emission, since all or a large percentage of the 4-cycle exhaust is further combusted in the unit 2-cycle cylinder means. Moreover, the novel engine in accordance with the invention, has greater over-all efficiency, or at least an efficiency sustained over a greater range of rpm than the conventional engine. Thus, when the efficiency of the 4-cycle component of the novel engine in accordance with the invention begins to drop off as the rpm increases, the efficiency of the unit 2-cycle component thereof begins to increase so that the net result is a sustained efficiency over substantially greater range of rpm than is possible with either a single 4-cycle engine or a single 2-cycle engine.

BRIEF DESCRIPTION OF THE DRAWINGS

In the Drawings

FIG. 1 is a schematic view of a multiple-cycle, piston-type internal combustion engine, according to the invention.

FIG. 2 is a diagram showing the firing order.

FIG. 3 is a graph showing the over-all efficiency of the engine.

FIG. 4 is a modification of the two-cycle cylinder.

FIG. 5 also is a modification of the 2-cycle cylinder.

FIG. 6 is a detailed view of FIG. 5.

FIG. 7 is a schematic view of a V-8 engine according to the invention.

In FIG. 1 there is illustrated a multiple-cycle, piston-type internal combustion engine according to the invention made up of two basic units, each of which comprises a 2-cycle cylinder 1 and two 4-cycle cylinders 2 and 3. In unit A, these cylinders are designated, respectively, 1a, 2a, and 3a, and in unit B, respectively, 1b, 2b, and 3b. The 4-cycle cylinders 2 and 3 operate 360° apart, that is, when cylinder 2 is on power stroke as illustrated at 2a, cylinder 3 is on intake as illustrated at 3a, and when cylinder 2 is on compression as illustrated at 2b, cylinder 3 is on exhaust as illustrated at 3b. Thus, while the cylinders 2a and 3a are comprised in unit A and cylinders 2b and 3b are comprised in unit B, they also, nonetheless, represent the four cycles of a 4-cycle engine, namely, power (2a), intake (3a), compression (2b), and exhaust (3b). The 2-cycle cylinders 1 are arranged to fire 90° after the 4-cycle cylinders. Thus, in FIG. 1, cylinder 2a is 90° along on the power stroke and cylinder 1a has just come up to firing position and when cylinder 2b has reached 90° past its firing position, cylinder 1b will have reached top dead center and be ready to fire.

When two units are used, they are desirably operated 180° out of phase so that when the pistons in the A unit are at top dead center, the corresponding pistons in the B unit are at bottom dead center. If three units are used, they will be operated 120° apart, and so on.

Each of the cylinders 1, 2, and 3, respectively, have casings 10, 12, and 14; pistons 16, 18, and 20; connecting rods 22, 24, and 26; and cranks 28, 30, and 32. The cranks 28, 30 and 32 are on a common shaft or else operatively connected to maintain the desired firing order as shown in FIG. 2. If three units are used, the firing order will, of course, be correspondingly adjusted.

Each of the 4-cycle cylinders 2 and 3 have means for introducing a combustible mixture thereinto before or during the compression stroke. This may be done by fuel injection or carburetion in accordance with practices already well known in the art. In FIG. 1 there is illustrated intake valves 36 and 38 communicating through manifolds 40 and 42 with carburetor 44. The cylinders 2 and 3 are also provided with exhaust valves 46 and 48 which communicates through the exhaust manifolds 50 and 52 with the intake manifold 54 of the 2-cycle cylinders.

The intake manifold 54 communicates with the 2-cycle cylinders 1 operative to admit the 4-cycle exhaust into the 2-cycle cylinders. The 2-cycle cylinder casings have one or more sidewall ports 58 adapted to exhaust the 2-cycle exhaust through the manifold 60 into the exhaust pipe 62.

The top of the sidewall ports 58 coincides with the top of the piston 16 when the crank 28 is about 80° from bottom dead center. Thus, the sidewall ports open when the crank is about 80° from bottom dead center and close when it is about 80° past bottom dead center. The intake valves 56 are cam actuated (not shown) in the usual manner to open slightly, say about 10°–15°, after the sidewall ports open. This lag in the opening of the inlet ports is provided in accordance with practices already well known in the art to provide for expansion of the 2-cycle exhaust gases out the exhaust pipe 62 so that the pressure in the 2-cycle cylinders when the intake ports open is not greater than that obtaining in the intake manifold, 54, or at least not sufficiently greater as to cause an undesirable backflow of 2-cycle exhaust into the intake manifold 54.

It may be desirable to provide a sealing ring 64 on the 2-cycle piston 16 in order to prevent flow-by of 2-cycle exhaust gas into the crankcase.

If desired, there may be provided an auxiliary carburetor 66 to provide additional air and/or fuel for admixture with the 4-cycle exhaust admitted into the 2-cycle cylinders. The effluent from the carburetor 66 which may be either air, fuel vapor, or a mixture of air and fuel vapor passes through pump 68 and through pipe 70 to a suitable mixing chamber 72 which may be at the juncture of the outlet 74 of the 4-cycle exhaust manifold, the outlet 76 of the pipe 70, and the inlet 78 of the 2-cycle intake manifold 54.

In the position shown in FIG. 1, cylinder 1a is ready to fire, cylinder 2a is half way through its power cycle; cylinder 3a is half way through its intake cycle; cylinder 1b is half way through its exhaust cycle; cylinder 2b is half way through its compression cycle; and cylinder 3b is half way through its exhaust cycle. When cylinder 1b moves an additional 80°, the sidewall ports 58b close. The intake valve 56b may close at the same time, or slightly before, say about 10°–15° before. At the same time cylinder 3b is nearing completion of its exhaust cycle. Since there is very little upward motion of the piston 20b during this part of the exhaust cycle, there is no substantial buildup of pressure in the the 4-cycle exhaust manifold 50 notwithstanding all the ports 56b and 58b are closed. In the next 180° the piston of cylinder 1b will have moved to the top dead center position and be ready for firing. At the same time piston 1a will have moved down to bottom dead center and will be half way through its exhaust cycle and will be receiving exhaust gases from cylinder 2a. The cycle then continues according to the firing order shown in FIG. 2 with each 2-cycle cylinder, one firing every revolution 180° after the other, and each of the 4-cycle cylinders firing every other revolution 90° before a 2-cycle cylinder fires. In this manner there is provided a continuous supply of 4-cycle exhaust to the intake ports of the 2-cycle cyinders and the intake ports of the 2-cycle cylinders are always open, save for the 10°–25° or so lag mentioned above, to receive the 4-cycle exhaust. The 4-cycle exhaust fills the 2-cycle cylinders and flashes out the 2-cycle exhaust through the sidewall ports 58 and out into the exhaust pipe 62. Any surplus of 4-cycle exhaust will also pass out through exhaust pipe 62.

In order to minimize the amount of 4-cycle exhaust which passes through the 2-cycle cylinders, the displacement capacity of the 2-cycle cylinders should be at least twice that of the 4-cycle cylinders. This can suitably be accomplished by providing two cylinders 1a-1 and 1a-2, operating in parallel or unison and two cylinders, 1b-1 and 1b-2, operating in parallel or unison. This involves simply a duplication of cylinders 1a and 1b and hooking them up in parallel arrangement as will be more particularly described hereinafter in regard to FIG. 7.

The multiple-cycle, piston-type internal combustion engine according to the invention as described above has advantages in that it provides for further combustion of the 4-cycle exhaust gases and thereby reduces emissions and at the same time recovers some of the energy otherwise lost. Thus, the over-all efficiency of the engine is greater than an ordinary 4-cycle or 2-cycle engine. In addition, a further increase of efficiency is obtained by a summation of the efficiency curves of a 4-cycle engine and those of a 2-cycle engine as shown in FIG. 3. Thus, a 4-cycle engine reaches maximum efficiency and tapers off as the rpm increases. So also does a 2-cycle engine, but the peak efficiency of the 2-cycle engine is at a considerably higher rpm than that of the 4-cycle engine. The multiple-cycle, piston-type internal combustion engine of the invention therefore provides for high efficiency over a greater range rpm than either a 4-cycle or a 2-cycle engine.

FIG. 4 shows a modified form of the 2-cycle cylinders in which the 2-cycle exhaust is exhausted through the exhaust valve 80 at the top of the cylinder and the 4-cycle exhaust is let into the 2-cycle cylinder through sidewall intake ports 82. In other words, the flow of gas is the reverse of that in the 2-cycle cylinders illustrated in FIG. 1. This modification has the advantage that the sidewall ports need not open as soon as in the modification of FIG. 1, but can be up to 10°–15° after the exhaust valve 80 opens. Thus, instead of the sidewall ports 82 opening 80° before bottom dead center as in the modification of FIG. 1, they may open as late as 70° or even 65° from bottom dead center. Thus, in the modification of FIG. 4, there is provided a longer power stroke than in that of the modification of FIG. 1. In this modification there may also be provided the sealing ring 64 to prevent passage of exhaust gases into the crankcase of the 2-cycle cylinders.

In the modification illustrated in FIG. 5, the 4-cycle exhaust is fed through sidewall port means 84 and the 2-cycle exhaust is exhausted through sidewall exhaust port means 86. The intake port means 84 and the exhaust port means 86 advantageously are located diametrically across from each other. The top of the exhaust port means 86 is located slightly higher than the intake port means 84 as shown, in order to provide the desired lag in the opening of the intake port means as explained above. As usual in this type of 2-cycle engine, the top of the piston 16 may be provided with a deflector 88 for deflecting the incoming 4-cycle exhaust gases upwardly into the cylinder and thus more effectively to displace the 2-cycle exhaust.

If desired, the piston 16 may be provided with a square sealing ring 90 effective to prevent the 4-cycle exhaust gases from passing through inlet port 84 down along the sidewalls of the piston 60 into the crankcase. If desired, a similar square ring can be provided on the opposite side of the piston to prevent any back-flow of 2-cycle exhaust into the crankcase. Advantageously, the square ring 90 may extend up to the piston ring or rings 92.

In the form of the invention shown in FIG. 1 the firing order of the A unit is 2a-1a-3a-1a and that of the B unit is 2b-1b-3b-1b. In such a unit the 4-cycle cylinder fires only once in two revolutions. Therefore, it is desirable to combine at least two units operating 180° apart so that there will be at least one 4-cycle cylinder firing each revolution. In such a combination the firing order is that shown in FIG. 2.

An ordinary straight-8 engine can readily be converted to a multiple-cycle engine according to the invention by converting four cylinders to 2-cycle operation, two each of which operate in parallel. Thus, if the firing order of the straight-8 were 1,6,2,5,8,3,7,4, the firing order of the converted engine would be (1,8)-6-(2,7)-5-(1,8)-3-(2,7)-4 because in such a firing order the 1 and 8 cylinders reach top dead center simultaneously at the same time cylinders 2 and 7 simultaneously reach bottom dead center. In comparing such a modified straight 8 engine to the modification in FIG. 1, cylinders 1 and 8 operating in parallel correspond to cylinder 1a; cylinder 6 to cylinder 2b; cylinders 2 and 7 operating in parallel correspond to cylinder 1b; cylinder 5 to cylinder 3a; cylinder 3 to cylinder 3b; and cylinder 4 to cylinder 2a.

Alternatively, one may convert cylinders 3, 4, 5, and 6 to 2-cycle operation because cylinders 3 and 6 simultaneously reach top dead center at the same time cylinders 4 and 5 simultaneously reach bottom dead center. In such case the firing order would be 1-(3,6)-2-(4,5)-8-(3,6)-7-(4,5). The correspondence with the modification in FIG. 1 would be cylinder 1 equals cylinder 2a; cylinders 3 and 6 operating in parallel equal cylinder 1a; cylinder 2 equals cylinder 2b; cylinders 4 and 5 operating in parallel equal cylinder 1b; cylinder 8 equals cylinders 3a; and cylinder 7 equals cylinder 3b.

In FIG. 7 there is shown a diagramatic illustration of a V-8 engine modified according to the invention. The view is looking from the rear of the engine and the numbering is the standard Chevrolet numbering. The original firing order was 1-8-4-3-6-5-7-2. It will be observed that cylinders 1 and 6 simultaneously are at top dead center and that cylinders 4 and 7 at the same time are simultaneously at bottom dead center. Thus, cylinders 1 and 6 operating in parallel are converted to 2-cycle operation and are the equivalent of cylinder 1a in FIG. 1 and FIGS. 4 and 7 are also converted to 2-cycle operation and are equivalent to cylinder 1b in FIG. 1. Thus, the firing order in the modified engine is (1,6)-8-(4,7)-3-(1,6)-5-(4,7)-2. Thus, the converted engine has two unit 2-cycle cylinders, to wit, 1–6 and 4–7, and four 4-cycle cylinders to wit, 2, 3, 5, and 8. Thus, cylinders 1–6, 2, and 3 make up one basic unit and cylinders 4–7, 5, and 8 make up the second basic unit.

In operation the fuel mixture from the primary carburetor 94 passes into the intake manifold 96 from which it is admitted into the 4-cycle cylinders on the intake cycle. The 4-cycle exhaust exhausts into the exhaust manifold 98 whence it passes through pipe 100 into pressure chamber 102 and thence through pipe 104 into the 2-cycle intake manifold 106. If desired, air or fuel or a mixture of air and fuel can be pumped by pump 108 from auxiliary carburetor 110 into the pressure or expansion chamber 102.

The 4-cycle exhaust, with or without admixture with air and/or fuel, is conducted by the 2-cycle intake manifold to the inlet ports 112, 114, 116, and 118 and fills the 2-cycle cylinders thus sweeping out the 2-cycle exhaust thru the exhaust ports 120, 122, 124 and 126 and on out to the final exhaust pipe 128.

Pressure or expansion chamber 102 is optional and can be omitted, in which case, the 4-cycle exhaust is fed directly into the 2-cycle intake manifold and the air or fuel vapors or mixtures of the two from pump 108 is fed either into the 4-cycle exhaust manifold or into the 2-cycle intake manifold, or to the junction of the two as in the modification of FIG. 1. If desired, an auxiliary air blower or compressor 130 can be provided for introducing air into the 4-cycle exhaust manifold or, if desired, to the 2-cycle intake manifold. If the latter, it should be admitted at the point where the 4-cycle exhaust is admitted in order to get effective mixing and distribution to the several 2-cycle intake ports.

It will be understood that the particular firing orders given and the particular arrangements given are by way of illustration only and that variations can be made therein without departing from the spirit and scope of the invention as long as the engine has at least one basic unit comprising two 4-cycle cylinders operating 180° apart and a unit 2-cycle cylinder firing 90° after the 4cycle cylinders and the 4cycle exhaust gases are channeled directly to the unit 2-cycle cylinders and further combusted therein.

It is to be understood that the invention is not to be limited to the exact details of operation or structure shown and described as obvious modifications and equivalents will be apparent to one skilled in the art.

I claim:

1. In a process for generating power, the steps comprising:
   (1) combusting non-recycled fuel in the power generating stroke of a 4-cycle internal combustion engine;
   (2) expanding the exhaust from the 4-cycle internal combustion engine;
   (3) feeding the expanded 4-cycled exhaust to the intake port means of a 2-cycle internal combustion engine during substantially all of the exhaust-intake stroke thereof;
   (4) compressing 4-cycle exhaust thus fed to said 2-cycle internal combustion engine in the compression stroke thereof;
   (5) combusting the thus compressed 4-cycle exhaust in the power generating stroke of said 2-cycle internal combustion engine with all ports closed; and
   (6) venting the combustion 4-cycle exhaust and thereby allowing it to expand in said 2-cycle internal combustion engine;
   (7) the feeding of expanded 4-cycle exhaust into said intake port means during the exhaust-intake stroke acting to force expanded 2-cycle exhaust from said 2-cycle internal combustion engine and in which two cylinders of said 4-cycle internal combustion engine operating substantially 180° apart feed exhaust gas to one unit 2-cycle cylinder of said 2-cycle internal combustion engine operating substantially 90° after said 4-cycle cylinders, whereby the exhaust of said 4-cycle cylinders alternately feeds the exhaust-intake stroke of the unit 2-cycle cylinder.

2. A method of operating a unit of an internal combustion engine comprising at least one unit of two four-stroke cylinders and one two-stroke cylinder, each having a piston adapted to reciprocate between top dead center and bottom dead center, intake port means, and exhaust port means in which the four-stroke exhaust port means for both the four-stroke cylinders is connected with the two-stroke intake port means, which method comprises the following cycle of steps:
   (1) opening the four-stroke exhaust port means of one four-stroke cylinder releasing exhaust thereof and shortly thereafter opening said two-stroke intake port means while said 2-stroke exhaust port means is open;
   (2) admixing oxygen with said four-stroke exhaust to form a combustible mixture and causing said combustible mixture to pass through said two-stroke intake port means into said two-stroke cylinder;
   (3) closing said two-stroke intake port means and said two-stroke exhaust port means when said two-stroke cylinder is substantially filled with said combustible mixture and while the two-stroke piston is on its way from bottom dead center to top dead center, whereby said combustible mixture is compressed in said two-stroke cylinder;
   (4) igniting the compressed combustible mixture substantially at top dead center, whereby said two-stroke piston is moved toward bottom dead center by the combustion and work is accomplished;
   (5) opening said two-stroke exhaust port means to permit free expansion of the combusted combustible mixture through said 2-stroke exhaust port means;
   (6) opening the four-stroke exhaust port means of the second four-stroke cylinder releasing exhaust theeof and shortly thereafter opening said 2-stroke intake port means while said exhaust port means is open;
   (7) admixing oxygen with said last named four-stroke exhaust to form a combustible mixture and causing same to pass through said two-stroke intake port means into said two-stroke cylinder;
   (8) closing said two-stroke intake port means and said two-stroke exhaust port means when said two-stroke cylinder is substantially filled with said last named combustible mixture and while the two-stroke piston is on its way from bottom dead center to top dead center, whereby said last named combustible mixture is compressed in said two-stroke cylinder;
   (9) igniting the compressed combustible mixture thus formed substantially at top dead center, whereby said two-stroke piston is moved toward bottom dead center by the combustion and work is accomplished;
   (10) opening said two-stroke exhaust port means to permit free expansion of the combusted combustible mixture thus formed through said 2-stroke exhaust port means to complete said cycle; and
   (11) opening the four-stroke exhaust port means of the first four-stroke cylinder to begin a new cycle comprising steps 1 through 10, and in which the two 4-stroke cylinders operate substantially 180° apart and the 2-stroke cylinder fires substantially 90° after each 4-stroke cylinder fires, and is at bottom dead center when each 4-stroke cylinder is half way up its exhaust stroke.

3. A method of claim 2 in which said exhaust port means is opened about 80° before bottom dead center and closed about 80° after bottom dead center and said intake port means is opened about 10° to 15° after the exhaust port means is opened and is closed about 10° to 15° before said exhaust port means is closed.

* * * * *

UNITED STATES PATENT AND TRADEMARK OFFICE
CERTIFICATE OF CORRECTION

PATENT NO. : 4,321,892
DATED : March 30, 1982
INVENTOR(S) : Robert M. Anger

It is certified that error appears in the above—identified patent and that said Letters Patent is hereby corrected as shown below:

IN THE DRAWINGS (sheet 3), FIG. 7 (in the middle part of the drawing);
"CYLINDER #4-2 CYCLE" should read -- CYLINDER #4-2 CYCLE --
Col. 3, line 26; insert -- at -- after "great"
Col. 3, line 59; "4-cyle" should read -- 4-cycle --
Col. 5, line 31; "in" should read -- is --
Col. 5, line 56; "comingled" should read -- co-mingled --
Col. 8, line 17; delete "the" (1st occurrence)
Col. 8, line 31; "cyinders" should read -- cylinders --
Col. 10, line 6; "cylinders" should read -- cylinder --
Col. 10, line 61; "4cycle" (1st occurrence) should read -- 4-cycle --
Col. 10, line 61; "4cycle" (2nd occurrence) should read -- 4-cycle --
Col. 12, line 15; "theeof" should read -- thereof -- Paper 28, claim 2 (old claim 22), page 4, line 31 of claim.

Signed and Sealed this

Twentieth Day of July 1982

[SEAL]

Attest:

GERALD J. MOSSINGHOFF

Attesting Officer

Commissioner of Patents and Trademarks